United States Patent [19]

Stevens

[11] Patent Number: 5,320,888

[45] Date of Patent: Jun. 14, 1994

[54] FLUOROELASTOMER LAMINATES

[75] Inventor: Ronald D. Stevens, Norton, Ohio

[73] Assignee: E. I. du Pont de Nemours and Company, Wilmington, Del.

[21] Appl. No.: 150,906

[22] Filed: Nov. 12, 1993

[51] Int. Cl.⁵ .......................... B32B 1/08; B32B 27/28
[52] U.S. Cl. .................................. 428/36.2; 428/36.8; 428/36.91; 428/252; 428/421; 428/422
[58] Field of Search ................... 428/36.2, 36.8, 36.91, 428/252, 421, 422

[56] References Cited

U.S. PATENT DOCUMENTS 4,806,351  2/1989  Sugimoto et al. .................... 428/421

OTHER PUBLICATIONS

Japanese Patent Publication 5177771 Derwent Abstract of Patent Issued Jul. 20, 1993.

*Primary Examiner*—James C. Cannon

[57] ABSTRACT

Laminates of fluoroelastomer, non-elastomeric fluoropolymer and non-fluorinated elastomer provide an excellent combination of flexibility and permeability resistance.

12 Claims, 1 Drawing Sheet

FLUOROELASTOMER LAMINATES

BACKGROUND OF THE INVENTION

Fluoroelastomers, such as those described in U.S. Pat. Nos. 3,682,872, 4,281,092 and 4,592,784, have achieved outstanding commercial success, and are used in a wide variety of applications in which unusually severe environments are encountered. However, unusual performance requirements are encountered in specialized applications such as fuel hoses and fuel pump diaphragms. One attempt to satisfy this need was described in Sugimoto et al. U.S. Pat. No. 4,806,351, in which a composite of an "FKM" or fluoroelastomer was bonded to a layer of NBR, or general-purpose rubber. Despite the development of such laminates, a continuing need exists for materials which can be used for applications such as hoses and diaphragms having greater fuel permeation resistance. However, a problem in satisfying this need is the provision of materials which exhibit both flexibility and high fuel permeation resistance.

SUMMARY OF THE INVENTION

The present invention provides an improved laminate which exhibits an outstanding combination of flexibility and fuel permeation resistance.

Specifically, the instant invention provides a laminar structure comprising, and bonded together in the order specified,
(a) a layer of fluoroelastomer having a thickness of about from 0.1 to 1.5 mm;
(b) a layer of non-elastomeric fluoropolymer having a thickness of about from 0.01 to 0.1 mm and treated to promote adhesion; and
(c) a layer of non-fluorinated elastomer having a thickness of about from 1.0 to 2.5 mm.

DETAILED DESCRIPTION OF THE INVENTION

Figure 1:
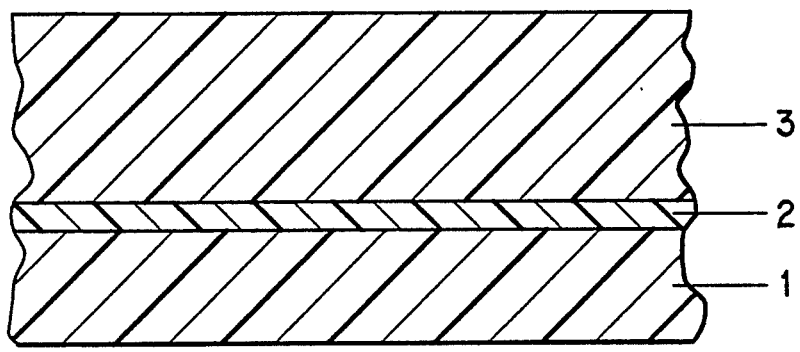
FIG. 1 is a cross-sectional illustration of a laminar structure of the present invention.

The present invention is a laminar structure comprising a fluoroelastomer, a non-elastomeric fluoropolymer, and non-fluorinated elastomer.

Fluoroelastomers which can be used in the present invention include a wide variety of materials, generally based on vinylidene fluoride ($VF_2$) monomer. The most common hydrogen-containing fluoropolymers are copolymers of $VF_2$ with hexafluoropropylene (HFP) and optionally tetrafluoroethylene (TFE). However, the use of other fluoromonomers and of monomers that do not contain fluorine is well known. Other monomers that can be used include chlorotrifluoroethylene (CTFE), hydrocarbon olefins such as ethylene (E) or propylene (P), and perfluoro (alkyl vinyl) ether (PAVE) having the formula $CF_2=CFO(CF_2CFX-O)_nR_f$ wherein X is F or $CF_3$, n is 0–5, and $R_f$ is a perfluoroalkyl group of 1-6 carbon atoms. A preferred PAVE for use in hydrogen-containing fluoroelastomers is perfluoro(methyl vinyl) ether (PMVE). Fluoropolymers incorporating such monomers include TFE/$VF_2$/PMVE, E/TFE/PMVE, TFE/P and TFE/P/$VF_2$. For best performance with fluids which swell fluoroelastomers, those fluoroelastomers with high fluorine content, e.g., greater than about 68%, are preferred.

Representative peroxide-curable fluoropolymers which can be used in the present compositions are described in Apotheker et al., U.S. Pat. No. 4,035,565; Tatemoto et al., U.S. Pat. No. 4,243,770; Albin, U.S. Pat. No. 4,564,662; Arcella et al., U.S. Pat. No. 4,745,154; Moore, U.S. Pat. No. 4,948,852; Moore, U.S. Pat. No. 4,973,633; Logothetis, U.S. Pat. No. 4,948,853; Breazeale, U.S. Pat. No. 4,281,092; Finlay, U.S. Pat. No. 4,529,784; Logothetis, U.S. Pat. No. 4,972,038 and Arcella et al., U.S. Pat. No. 5,177;148, each of which is hereby incorporated by reference.

In general, the fluoroelastomer has a thickness of about from 0.1 to 1.5 mm, and, for typical fuel hose and fuel diaphragm applications, a thickness of less than about 1.0 mm has been found to be particularly satisfactory.

The second layer, bonded to the fluoroelastomer, is a non-elastomeric fluoroplastic material. One such material is polyvinylidene fluoride and copolymers of $VF_2$ with at least one of HFP and TFE. These materials are preferably selected from polymers and copolymers of tetrafluoroethylene. Such polymers can include polytetrafluoroethylene (PTFE); tetrafluoroethylene/hexafluoropropylene copolymers (FEP); copolymers of tetrafluoroethylene and PAVE, such as those commercially available from DuPont as Teflon ® PFA fluorocarbon resin; copolymers of tetrafluoroethylene and ethylene such as those commercially available from DuPont as Tefzel ® ETFE fluoropolymer; and copolymers of ethylene and CTFE. The second layer is present in a thickness of about from 0.01 to 0.1 mm, and preferably has a maximum thickness of about 0.05 mm. The non-elastomeric fluoropolymer is treated to promote adhesion, preferably by conventional corona discharge treatment.

A third central element of the present laminates is a non-fluorinated elastomer having a thickness of about from 1.0 to 2.5 mm. For typical fuel hose and diaphragm applications, a thickness of less than about 2.0 mm has been found to be particularly satisfactory. A wide variety of known elastomers can be used as this component, including, for example, NBR, epichlorohydrin, chlorosulonated polyolefins, and ethylene copolymers, particularly those copolymerized with a polar comonomer. Chlorosulfonated polyethylene elastomers are particularly preferred.

In addition to these three basic components of the present laminates, further layers can be provided to improve the overall performance characteristics. For example, reinforcing braiding can be incorporated into the structure, either between the non-elastomeric fluoropolymer layer and the non-fluorinated elastomer layer, or, alternatively, between two exterior layers of the non-fluorinated elastomer. A wide variety of materials can be used for the reinforcing braiding, including, for example glass fiber or polymeric fiber. Of these, polymeric fibers, and especially those consisting essentially of oriented polyester or polyaramid, are preferred.

Figure 2:
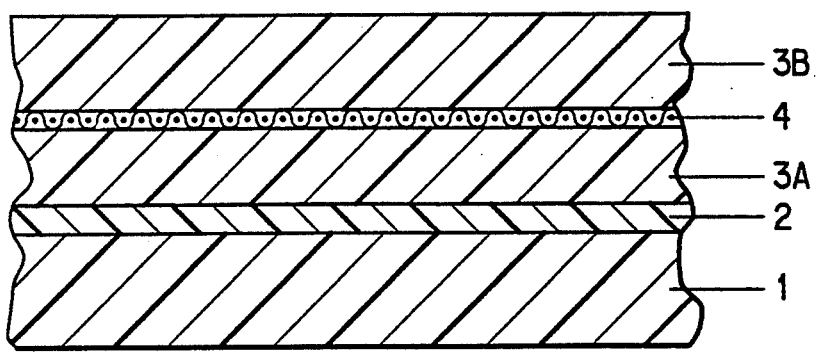
FIG. 2 is a cross-sectional illustration of a preferred laminar structure of the present invention.

The present laminates are illustrated in the Figures. In FIG. 1, fluoroelastomer layer 1 is bonded to non-elastomeric fluoropolymer 2 which is, in turn, bonded to non-fluorinated elastomer 3. In the preferred embodiment shown in FIG. 2, the non-fluorinated elastomer layer comprises two layers 3A and 3B, between which is reinforcing braiding 4.

In the preparation of the present laminates, particularly for hose applications, the layers are applied to a central mandrel in the required order, after which the structure is cured by heating at elevated temperatures, for example, 150°–200° C., to perfect the final cure of the components.

The present invention is further illustrated by the following specific examples, in which parts and percentages are by weight unless otherwise indicated.

EXAMPLE 1 and CONTROL EXAMPLE A

A diaphragm was prepared by bonding together six inch (15.2 cm) square sheets of three components. The first component was a 0.030 inch (0.76 mm) layer of elastomeric fluoropolymer compound derived from a precompound based on peroxide-curable fluoroelastomer and containing 0.4 phr of tetrabutyl ammonium bromide and 2.8 phr of an accelerator and bisphenol AF based curative system (VITON® Curative No. 50, DuPont). The fluoroelastomer in this instance had weight composition $VF_2/HFP/TFE = 36/36/28$, contained 0.2 wt % iodine, had Mooney viscosity ($ML_{1+10}$ at 121° C.) of 20, and was prepared generally by the procedure of U.S. Pat. No. 4,948,852 with omission of cure site monomer. The second layer was a 0.002 inch (0.05 mm) thickness of FEP fluorocarbon resin commercially available from DuPont as Teflon® FEP fluorocarbon film 200C20. The film had been treated by corona discharge to improve adhesion. The third layer was a 0.050 inch (1.27 mm) thickness of chlorosulfonated polyethylenes elastomer (CSPE) compound based on two chlorosulfonated polyethylenes, both having nominally 1 wt % sulfure and 35 wt % chlorine. CSPE-1 had Mooney viscosity ($ML_{1+4}$ at 100° C.) of 50–60, and CSPE-2 had Mooney viscosity of 25–35.

The formulations of the two elastomeric components were as follows:

| Fluoroelastomer Compound | |
|---|---|
| Fluoroelastomer precompound | 100 |
| Magnesium Oxide | 6 |
| MT Black (N990) | 15 |
| Calcium Metasilicate | 20 |
| Carnauba Wax | 1 |
| Ca(OH)$_2$ | 4 |
| Triallyisocyanurate | 0.8 |
| 50% active peroxide curing agent | 0.8 |
| Non-Fluorinated Elastomer Compound | |
| CSPE-1 | 50 |
| CSPE-2 | 50 |
| Magnesium Oxide | 20 |
| CA(OH)$_2$ | 10 |
| Kenflex A antioxidant | 5 |
| SRF Black (N762) | 40 |
| Calcium Carbonate | 60 |
| Dioctyl Sebacate | 15 |
| Polyethylene processing aid | 5 |
| Polyethylene glycol processing aid | 5 |
| Triallylcyanurate dispersion | 4.5 |
| 50% active peroxide curing agent | 7 |

The three layer laminate was cured in a rubber slab mold for 30 minutes at 162° C. The adhesion between the three layers was excellent. After molding, the six inch square samples were cut into three inch (7.6 cm) diameter round discs and tested in Thwing Albert permeation cups using M25 fuel (75% Fuel C/25% Methanol). The test method for these Thwing Albert cups is described in detail in SAE paper #920163. This test method is a modification of ASTM E96.

Control Example (A) was a layer of the same fluoroelastomer having a thickness of 0.76 mm. The permeation results are summarized in the table below, in which the materials were tested for mixtures of regular automotive fuel with 25% methanol and 10% ethanol. The tests were carried out at 23° C. The results are reported in g/m$^2$/day.

TABLE

| Time (Hours) | 75% Fuel C/ 25% Methanol | | 90% Fuel C/ 10% Ethanol | |
|---|---|---|---|---|
| | EXAMPLE | | | |
| | A | 1 | A | 1 |
| 48 | — | −0.17 | — | −0.06 |
| 96 | 6.7 | −0.88 | −0.16 | −0.93 |
| 264 | 14.7 | 0.02 | 2.5 | 0 |
| 336 | 15.2 | 0.08 | 3.8 | −0.26 |
| 408 | 19.9 | — | 5.6 | — |
| 672 | 15.0 | 0.25 | 4.0 | −0.27 |

The laminates of the present invention showed markedly lower fuel permeation than the fluoroelastomer alone, while retaining the flexibility of a conventional fluoroelastomer.

EXAMPLES 2 and 3

In Example 2, hose was prepared by extruding a thin 0.030" (0.76 mm) layer of the fluoroelastomer compound of Example 1 onto a flexible EPDM mandrel. The fluoroelastomer compound was prepared in 2.5 inch (63.5 mm) cold feed Davis Standard extruder, and was applied to the mandrel using a conventional crosshead extrusion process. After the fluoroelastomer compound was on the mandrel, a tape of non-elastomeric fluoropolymer was wrapped over the fluoroelastomer. The tape was 1.75" (44.5 mm) wide by 0.002" (0.05 mm) thick, and was FEP polymer, corona discharge treated to improve adhesion, and of the same grade used in Example 1. This laminate was then fed back through the crosshead on the Davis Standard extruder with a layer of 0.040" (1.0 mm) of the non-fluorinated elastomer compound of Example 1 being applied. This laminate was then fed into a yarn braider, and a textile braid of polyester was applied over the non-fluorinated elastomer. Lastly, a cover of 0.080" (2.0 mm) of the same non-fluorinated elastomer compound was applied to cover the hose.

The hose was then placed in a steam vulcanizer for 40 minutes at 80 psig (162° C.) to crosslink the elastomers in the laminate. The hose was then taken out of the autoclave, and the EPDM mandrel removed. In the resulting hose, adhesion of the non-elastomeric fluoropolymer to both the fluoroelastomer veneer and the non-fluorinated elastomer layer was good.

In Example 3, a hose was made at the same time as Example 2 and having a 0.045" (1.1 mm) veneer of the same fluoroelastomer compound extruded onto an EPDM mandrel using the same 2.5 (63.5 mm) inch Davis Standard 20:1 extruder. The fluoroelastomer veneer then had FEP tape spiral wrapped onto it, was braided with the polyester yarn, and covered with the same non-fluorinated elastomer compound. The resulting hose was steam vulcanized 40 minutes at 80 psig (0.55 MPa) (324° F.) (162° C.), then had the EPDM mandrel removed. The finished hose showed good adhesion between the non-elastomeric fluoropolymer and the fluoroelastomer and between the non-elastomeric fluoropolymer and the non-fluorinated elastomer where it had bled through the openings of the yarn braid.

The hose structures of Examples 2 and 3, if tested, will exhibit low fuel permeation while retaining the flexibility of conventional fluoroelastomer hoses.

I claim:

1. A laminar structure comprising, and bonded together in the order specified,
   (a) a layer of fluoroelastomer having a thickness of about from 0.1 to 1.5 mm;
   (b) a layer of non-elastomeric fluoropolymer having a thickness of about from 0.01 to 0.1 mm and treated to promote adhesion; and
   (c) a layer of non-fluorinated elastomer having a thickness of about from 1.0 to 2.5 mm.

2. A laminar structure of claim 1 wherein the fluoroelastomer is a copolymer prepared from tetrafluoroethylene, vinylidene fluoride and hexafluoropropylene.

3. A laminar structure of claim 2 wherein the fluoroelastomer comprises about from 15 to 35 wt % tetrafluoroethylene.

4. A laminar structure of claim 1 wherein the non-elastomeric fluoropolymer is selected from tetrafluoroethylene polymers and copolymers.

5. A laminar structure of claim 4 wherein the non-elastomeric fluoropolymer consists essentially of tetrafluoroethylene/hexafluoropropylene copolymer.

6. A laminar structure of claim 1 wherein the non-fluorinated elastomer consists essentially of chlorosulfonated polyethylene elastomer.

7. A laminar structure of claim 1 wherein the fluoroelastomer layer has a thickness of less than about 1.0 mm.

8. A laminar structure of claim 1 wherein the non-fluorinated elastomer has a thickness of less than about 2.0 mm.

9. A laminar structure of claim 1 wherein the structure further comprises a reinforcing braiding.

10. A laminar structure of claim 9 wherein the reinforcing braiding is between layers (b) and (c).

11. A laminar structure of claim 9 wherein the reinforcing braiding is exterior to the non-fluorinated elastomer and the laminar structure comprises a second non-fluorinated elastomer layer adjacent the reinforcing braiding.

12. A laminar structure of claim 9 wherein the reinforcing braiding is selected from at least one of polyester and polyaramide.

* * * * *